United States Patent
Giwa

(10) Patent No.: US 10,077,031 B1
(45) Date of Patent: Sep. 18, 2018

(54) POWERED ICE SCRAPING ASSEMBLY

(71) Applicant: Reuben Giwa, Roxbury, MA (US)

(72) Inventor: Reuben Giwa, Roxbury, MA (US)

( * ) Notice: Subject to any disclaimer, the term of this patent is extended or adjusted under 35 U.S.C. 154(b) by 0 days.

(21) Appl. No.: 15/442,288

(22) Filed: Feb. 24, 2017

(51) Int. Cl.
| | |
|---|---|
| *B60S 3/04* | (2006.01) |
| *A46B 13/00* | (2006.01) |
| *A46B 13/02* | (2006.01) |
| *A46B 15/00* | (2006.01) |
| *A47L 1/05* | (2006.01) |

(52) U.S. Cl.
CPC ............ *B60S 3/048* (2013.01); *A46B 13/001* (2013.01); *A46B 13/02* (2013.01); *A46B 15/0081* (2013.01); *A46B 2200/3046* (2013.01); *A47L 1/05* (2013.01)

(58) Field of Classification Search
CPC .. B60S 3/048; B60S 3/045; A47L 1/05; A47L 13/02; A47L 13/022; A47L 13/08; A47L 13/12; B08B 1/002; B08B 1/005; B08B 1/04; A46B 7/02; A46B 7/026; A46B 7/06; A46B 7/08; A46B 7/10; A46B 13/00; A46B 13/001; A46B 13/003; A46B 13/005; A46B 13/02; A46B 15/0081; A46B 2200/3046
USPC ...... 15/4, 23, 28, 111, 113, 236.02; D4/102, D4/118
See application file for complete search history.

(56) References Cited

U.S. PATENT DOCUMENTS

| | | | | |
|---|---|---|---|---|
| 1,599,713 A | * | 9/1926 | Perlman | ............................. 15/23 |
| 2,792,584 A | * | 5/1957 | Fryda | ...................... A46B 17/08 |
| | | | | 15/111 |
| 3,982,297 A | * | 9/1976 | Belluomo | .............. A46B 13/02 |
| | | | | 15/23 |
| 4,930,176 A | * | 6/1990 | Gelman | ..................... A47L 1/05 |
| | | | | 15/105 |
| D334,287 S | | 3/1993 | Ingles | |
| 6,243,906 B1 | | 6/2001 | Holliday | |
| 7,152,266 B1 | * | 12/2006 | Haughton | ............ A46B 5/0033 |
| | | | | 15/28 |
| 7,155,770 B2 | | 1/2007 | Anderson et al. | |
| 7,356,867 B1 | | 4/2008 | Beiermann | |
| 7,832,955 B1 | | 11/2010 | Leffew et al. | |
| D656,736 S | | 4/2012 | Hoffelner | |
| 9,107,490 B2 | | 8/2015 | Lafleur et al. | |
| 9,167,889 B1 | | 10/2015 | Ihde et al. | |
| 2006/0248666 A1 | * | 11/2006 | Lies | ......................... A46B 7/04 |
| | | | | 15/23 |

FOREIGN PATENT DOCUMENTS

| | | | |
|---|---|---|---|
| DE | 4442322 | * | 5/1996 |
| WO | WO2013059034 | | 4/2013 |

* cited by examiner

*Primary Examiner* — Mark Spisich

(57) ABSTRACT

A powered ice scraping assembly includes an ice scraper that is selectively manipulated thereby facilitating the ice scraper to frictionally abrade ice from a surface. A brushing unit is coupled to the ice scraper and the brushing unit includes a motor and a plurality of bristles. The motor is in mechanical communication with each of the bristles. Moreover, the motor rotates the bristles when the motor is turned on thereby facilitating the bristles to brush snow from the surface.

12 Claims, 4 Drawing Sheets

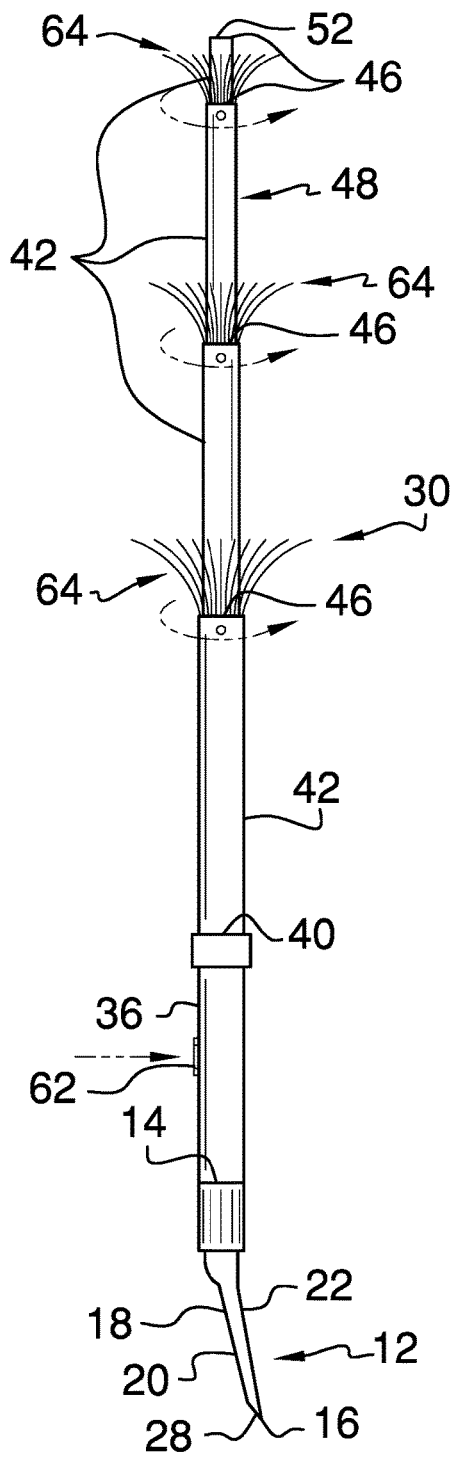
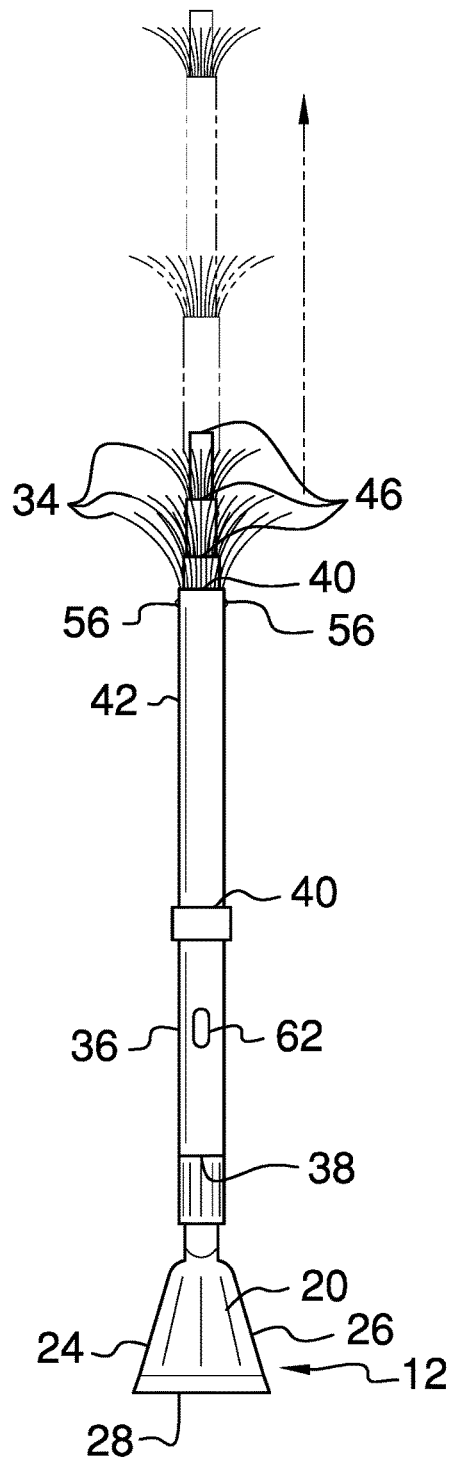
FIG. 2
FIG. 3

POWERED ICE SCRAPING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to ice scraping devices and more particularly pertains to a new ice scraping device for brushing snow and scraping ice from a vehicle.

BRIEF SUMMARY OF THE INVENTION

An embodiment of the disclosure meets the needs presented above by generally comprising an ice scraper that is selectively manipulated thereby facilitating the ice scraper to frictionally abrade ice from a surface. A brushing unit is coupled to the ice scraper and the brushing unit includes a motor and a plurality of bristles. The motor is in mechanical communication with each of the bristles. Moreover, the motor rotates the bristles when the motor is turned on thereby facilitating the bristles to brush snow from the surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a left side view of an embodiment of the disclosure.

FIG. 3 is a top view of an embodiment of the disclosure.

DETAILED DESCRIPTION OF THE INVENTION

Figure 1:
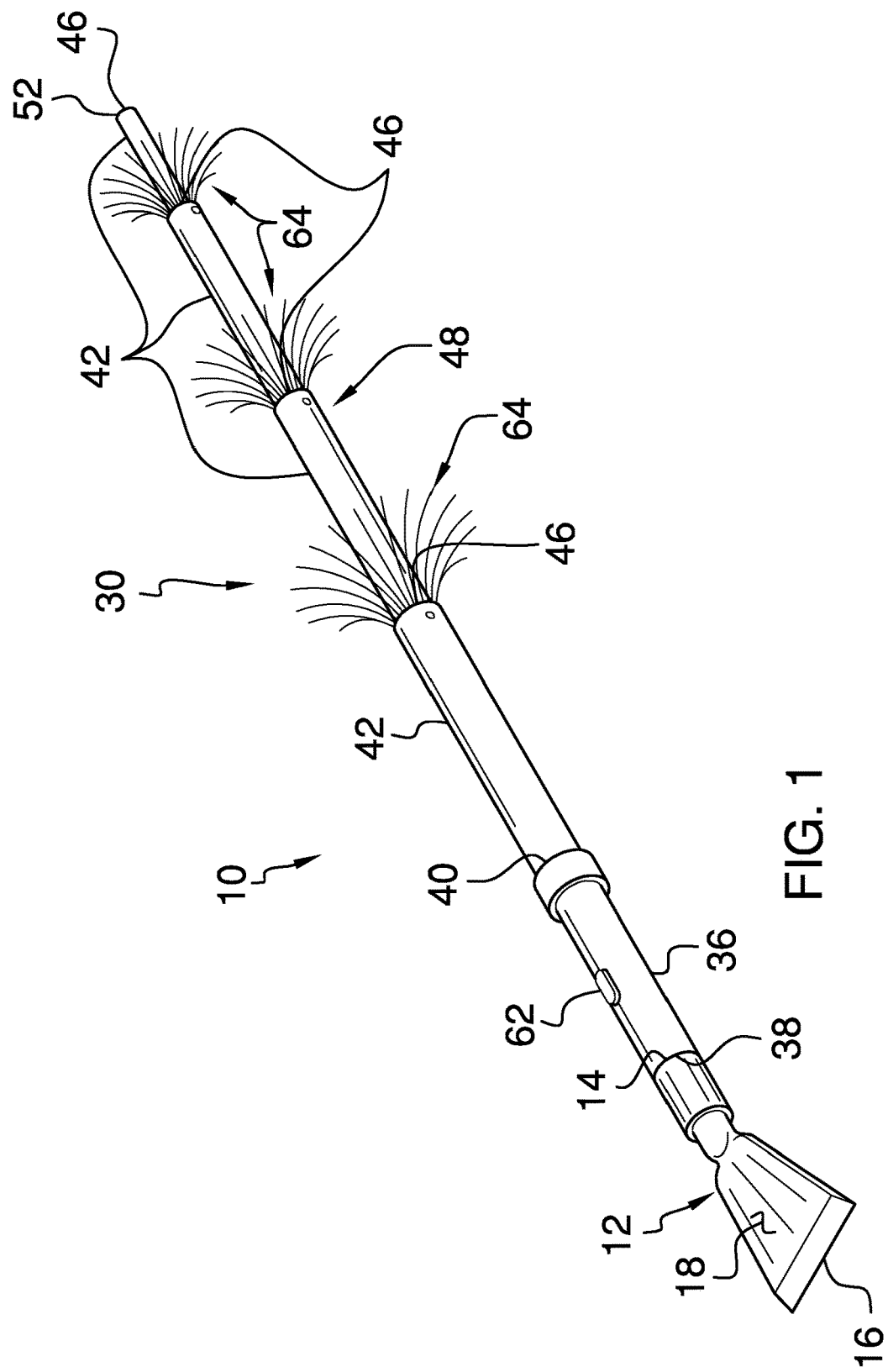
FIG. 1 is a perspective view of a powered ice scraping assembly according to an embodiment of the disclosure.
Figure 4:
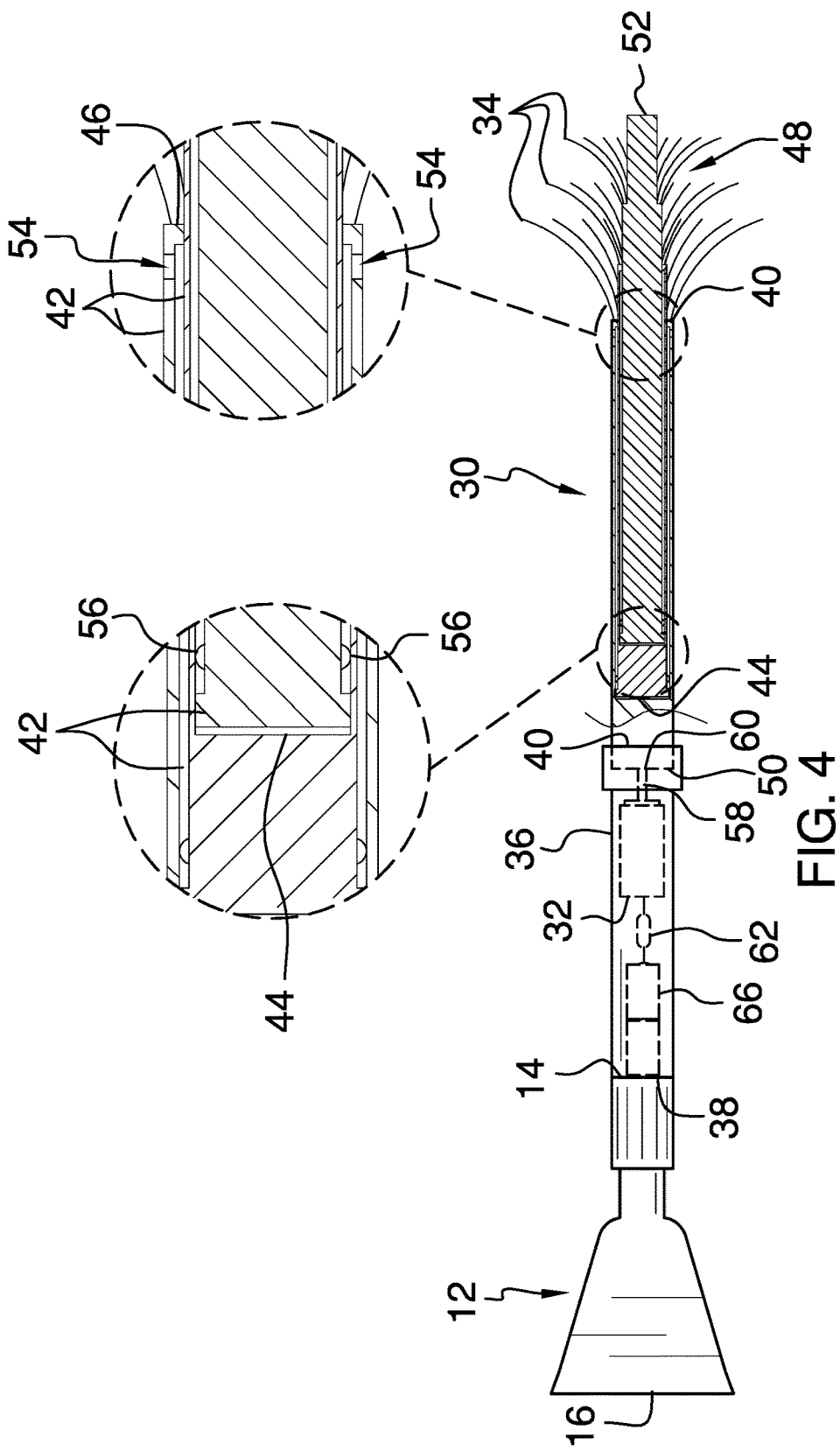
FIG. 4 is a bottom cut-away view of an embodiment of the disclosure.
Figure 5:
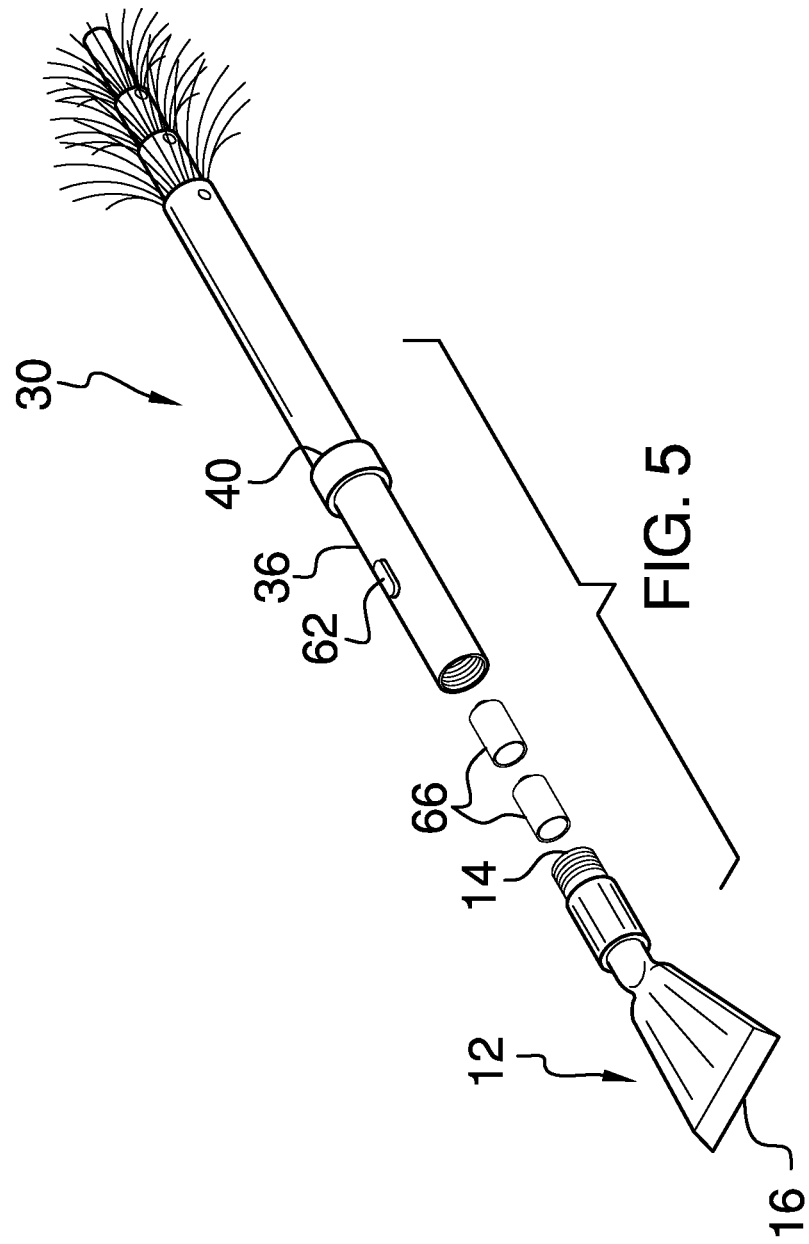
FIG. 5 is an exploded perspective view of an embodiment of the disclosure.

With reference now to the drawings, and in particular to FIGS. 1 through 5 thereof, a new ice scraping device embodying the principles and concepts of an embodiment of the disclosure and generally designated by the reference numeral 10 will be described.

As best illustrated in FIGS. 1 through 5, the powered ice scraping assembly 10 generally comprises an ice scraper 12 that may be manipulated thereby facilitating the ice scraper 12 to frictionally abrade ice from a surface. The surface may be a windshield on a vehicle or the like. The ice scraper 12 has a first end 14, a second end 16 and an outer surface 18 extending therebetween. The outer surface 18 has a top side 20, a bottom side 22, a first lateral side 24 and a second lateral side 26. The first lateral side 24 and the second lateral side 26 angle outwardly between the first end 14 and the second end 16. Thus, the ice scraper 12 has a wedge shaped cross section taken along a line extending through the top side 20 and the bottom side 22. The top side 20 tapers toward the bottom side 22 at the second end 16 to define a cutting edge 28. Moreover, the cutting edge 28 may frictionally engage the ice on the surface to scrape the ice from the surface.

A brushing unit 30 is coupled to the ice scraper 12 and the brushing unit 30 includes a motor 32 and a plurality of bristles 34. The motor 32 is in mechanical communication with the bristles 34 and the motor 32 rotates the bristles 34 when the motor 32 is turned on. In this way the bristles 34 may brush snow from the surface. The motor 32 may be an electric motor or the like and each of the bristles 34 may be comprised of a resiliently bendable material.

The brushing unit 30 comprises a first tube 36 that has a primary end 38 and a secondary end 40. The primary end 38 is coupled to the first end 14 of the ice scraper 12. Moreover, the first tube 36 is selectively gripped thereby facilitating the ice scraper 12 and the brushing unit 30 to be manipulated. The first tube 36 may threadably engage the ice scraper 12 or otherwise removably and mechanically engage the ice scraper 12. A plurality of second tubes 42 is provided and each of the second tubes 42 has a first end 44 and a second end 46. The first end 44 corresponding to each of the second tubes 42 is slidably positioned within the second end 46 of an adjacent one of the second tubes 42. In this way the plurality of second tubes 42 define a member 48 that has a telescopically adjustable length.

The member 48 has a proximal end 50 and a distal end 52. The proximal end 50 is removably and rotatably coupled to the secondary end 40 of the first tube 36. The plurality of second tubes 42 is selectively positioned in a collapsed position having the plurality of second tubes 42 being substantially contained within the adjacent second tube 42. Moreover, the plurality of second tubes 42 is selectively positioned in an extended position having the plurality of second tubes 42 extending substantially outwardly from the adjacent second tube 42.

Each of the second tubes 42 includes a pair of apertures 54. The pair of apertures 54 corresponding to each of the second tubes 42 extends into an interior of the corresponding second tube 42. Each of the second tubes 42 includes a pair of pins 56 and each of the pins 56 is movably coupled to the corresponding second tube 42. The pair of pins 56 corresponding to each of the second tubes 42 is biased outwardly from the corresponding second tube 42.

The pair of pins 56 of the corresponding second tube 42 extends outwardly from an associated one of the apertures 54 in the adjacent second tube 42 when the plurality of second tubes 42 is positioned in the extended position. In this way the plurality of second tubes 42 is selectively retained in the extended position. The pair of pins 56 corresponding to the second tube 42 is selectively urged inwardly of the associated aperture 54 in the adjacent second tube 42. In this way the plurality of second tubes 42 is selectively positioned in the collapsed position.

The motor 32 is positioned within the first tube 36 and a shaft 58 is coupled to the motor 32 such that the motor 32 rotates the shaft 58 when the motor 32 is turned on. The shaft 58 has a distal end 60 with respect to the motor 32 and the distal end 60 of the shaft 58 is coupled to the proximal end 50 of the member 48. In this way the shaft 58 rotates the member 48 about an axis extending through the proximal end 50 and the distal end 52 of the member 48 when the motor 32 is turned on. A switch 62 is coupled to the first tube 36 and the switch 62 is electrically coupled to the motor 32 to turn the motor 32 on and off.

The plurality of bristles 34 includes a plurality of sets of the bristles 64. Each of the sets of bristles 64 is coupled to second end 46 of an associated one of the second tubes 42. Additionally, each of the sets of bristles 64 is spaced apart from each other and is distributed around the associated second tube 42. A power supply 66 is removably positioned within the first tube 36 and the power supply 66 is electrically coupled to the motor 32. The power supply 66 comprises at least one battery.

In use, the first tube 36 is gripped to manipulate the ice scraper 12 for scrapping the ice from the surface. The distal end 52 of the member 48 is gripped and the distal end 52 of the member 48 is urged away from the ice scraper 12. In this way the plurality of second tubes 42 is urged into the extended position. The pins 56 on each of said second tubes 42 engage the associated aperture 54 on the adjacent second tube 42 to retain the plurality of second tubes 42 in the extended position. The switch 62 is manipulated to turn the motor 32 on and the member 48 is rotated. The member 48 is positioned adjacent to the surface thereby facilitating the plurality of bristles 34 to brush the snow from the surface. The pins 56 on each of the second tubes 42 are urged inwardly from the associated aperture 54 and the plurality of second tubes 42 is urged into the collapsed position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded.

A reference to an element by the indefinite article "a" does not exclude the possibility that more than one of the element is present, unless the context clearly requires that there be only one of the elements.

I claim:

1. A powered ice scraping assembly being configured to be turned on thereby facilitating snow to be brushed from a surface, said assembly comprising:

an ice scraper being configured to be manipulated thereby facilitating said ice scraper to frictionally abrade ice from a surface;

a brushing unit being coupled to said ice scraper, said brushing unit including a motor and a plurality of bristles, said motor being in mechanical communication with each of said bristles such that said motor rotates said bristles when said motor is turned on thereby facilitating said bristles to brush snow from the surface;

wherein said ice scraper has a first end, a second end and an outer surface extending therebetween, said outer surface having a top side, a bottom side, a first lateral side and a second lateral side, each of said first lateral side and said second lateral side angling outwardly between said first end and said second end such that said ice scraper has a wedge shaped cross section taken along a line extending through said top side and said bottom side, said top side tapering toward said bottom side at said second end to define a cutting edge wherein said cutting edge is configured to frictionally engage the ice on the surface; and wherein said brushing unit comprises a first tube having a primary end and a secondary end, said primary end being coupled to said first end of said ice scraper wherein said first tube is configured to be gripped thereby facilitating said ice scraper and said brushing unit to be manipulated.

2. The assembly according to claim 1, further comprising a plurality of second tubes, each of said second tubes having a first end and a second end, said first end corresponding to each of said second tubes being slidably positioned within said second end of an adjacent one of said second tubes to define a member having a telescopically adjustable length, said member having a proximal end and a distal end, said proximal end being removably and rotatably coupled to said secondary end of said first tube.

3. The assembly according to claim 2, wherein said plurality of second tubes is selectively positioned in a collapsed position having said plurality of second tubes being substantially contained within said adjacent second tube, said plurality of second tubes being selectively positioned in an extended position having said plurality of second tubes extending substantially outwardly from said adjacent second tube.

4. The assembly according to claim 2, wherein each of said second tubes includes a pair of apertures, said pair of apertures corresponding to each of said second tubes extending into an interior of said corresponding second tube.

5. The assembly according to claim 4, further comprising a pair of pins, each of said pins being movably coupled to a corresponding one of said second tubes, said pair of pins corresponding to each of said second tubes being biased outwardly from said corresponding second tube.

6. The assembly according to claim 5, wherein said pair of pins of said corresponding second tube extends outwardly from an associated one of said apertures in said adjacent second tube when said plurality of second tubes is positioned in said extended position to retain said plurality of second tubes in an extended position, said pair of pins corresponding to said second tube being selectively urged inwardly of said associated aperture in said adjacent second tube to position said plurality of second tubes in a collapsed position.

7. The assembly according to claim 2, wherein said plurality of bristles includes a plurality of sets of said bristles, each of said sets of bristles being coupled to said second end of an associated one of said second tubes, each of said sets of bristles being spaced apart from each other and being distributed around said associated second tube.

8. The assembly according to claim 1, wherein said motor is positioned within said first tube.

9. The assembly according to claim 8, further comprising:
a member having a proximal end and a distal end; and
a shaft being coupled to said motor such that said motor rotates said shaft when said motor is turned on, said shaft having a distal end with respect to said motor, said distal end of said shaft being coupled to said proximal end of said member such that said shaft rotates said member about an axis extending through said proximal end and said distal end of said member when said motor is turned on.

10. The assembly according to claim 8, further comprising a switch being coupled to said first tube wherein said switch is configured to be manipulated, said switch being electrically coupled to said motor such that said switch turns said motor on and off.

11. The assembly according to claim 1, further comprising a power supply being removably positioned within said first tube, said power supply being electrically coupled to said motor, said power supply comprising at least one battery.

12. A powered ice scraping assembly being configured to be turned on thereby facilitating snow to be brushed from a surface, said assembly comprising:
an ice scraper being configured to be manipulated thereby facilitating said ice scraper to frictionally abrade ice from a surface, said ice scraper having a first end, a second end and an outer surface extending therebetween, said outer surface having a top side, a bottom side, a first lateral side and a second lateral side, each of said first lateral side and said second lateral side angling outwardly between said first end and said second end such that said ice scraper has a wedge shaped cross section taken along a line extending through said top side and said bottom side, said top side tapering toward said bottom side at said second end to define a cutting edge wherein said cutting edge is configured to frictionally engage the ice on the surface;
a brushing unit being coupled to said ice scraper, said brushing unit including a motor and a plurality of bristles, said motor being in mechanical communication with said bristles such that said motor rotates said bristles when said motor is turned on thereby facilitating said bristles to brush snow from the surface, said brushing unit comprising:
a first tube having a primary end and a secondary end, said primary end being coupled to said first end of said ice scraper wherein said first tube is configured to be gripped thereby facilitating said ice scraper and said brushing unit to be manipulated,
a plurality of second tubes, each of said second tubes having a first end and a second end, said first end corresponding to each of said second tubes being slidably positioned within said second end of an adjacent one of said second tubes to define a member having a telescopically adjustable length, said member having a proximal end and a distal end, said proximal end being removably and rotatably coupled to said secondary end of said first tube, said plurality of second tubes being selectively positioned in a collapsed position having said plurality of second tubes being substantially contained within said adjacent second tube, said plurality of second tubes being selectively positioned in an extended position having said plurality of second tubes extending substantially outwardly from said adjacent second tube, each of said second tubes including:
a pair of apertures, said pair of apertures corresponding to each of said second tubes extending into an interior of said corresponding second tube, and
a pair of pins, each of said pins being movably coupled to a corresponding one of said second tubes, said pair of pins corresponding to each of said second tubes being biased outwardly from said corresponding second tube, said pair of pins of said corresponding second tube extending outwardly from an associated one of said apertures in said adjacent second tube when said plurality of second tubes is positioned in said extended position to retain said plurality of second tubes in said extended position, said pair of pins corresponding to said second tube being selectively urged inwardly of said associated aperture in said adjacent second tube to position said plurality of second tubes in said collapsed position;
said motor being positioned within said first tube,
a shaft being coupled to said motor such that said motor rotates said shaft when said motor is turned on, said shaft having a distal end with respect to said motor, said distal end of said shaft being coupled to said proximal end of said member such that said shaft rotates said member about an axis extending through said proximal end and said distal end of said member when said motor is turned on,
a switch being coupled to said first tube wherein said switch is configured to be manipulated, said switch being electrically coupled to said motor such that said switch turns said motor on and off,
said plurality of bristles including a plurality of sets of said bristles, each of said sets of bristles being coupled to said second end of an associated one of said second tubes, each of said sets of bristles being spaced apart from each other and being distributed around said associated second tube, and
a power supply being removably positioned within said first tube, said power supply being electrically coupled to said motor, said power supply comprising at least one battery.

* * * * *